(12) United States Patent
Fujii et al.

(10) Patent No.: US 8,459,728 B2
(45) Date of Patent: Jun. 11, 2013

(54) VEHICLE FRONT PORTION STRUCTURE

(75) Inventors: Takayuki Fujii, Wako (JP); Seiji Hayashi, Wako (JP); Masayo Akiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 27 days.

(21) Appl. No.: 13/338,967

(22) Filed: Dec. 28, 2011

(65) Prior Publication Data

US 2012/0187719 A1   Jul. 26, 2012

(30) Foreign Application Priority Data

Jan. 20, 2011   (JP) ................................. 2011-009565

(51) Int. Cl.
*B62D 25/08*   (2006.01)

(52) U.S. Cl.
USPC ............. 296/203.02; 296/187.09; 296/193.09

(58) Field of Classification Search
USPC ................... 296/187.09, 193.09, 203.02, 29, 296/30
See application file for complete search history.

(56) References Cited

U.S. PATENT DOCUMENTS

| | | | | |
|---|---|---|---|---|
| 4,189,177 A * | 2/1980 | Schwuchow et al. | ..... | 296/203.02 |
| 5,201,566 A * | 4/1993 | Mori | ............................. | 296/192 |
| 5,303,973 A * | 4/1994 | Fujii | ........................ | 296/203.02 |
| 6,209,948 B1 * | 4/2001 | Mori et al. | ............... | 296/187.09 |
| 6,705,670 B2 * | 3/2004 | Forssell et al. | ........... | 296/187.09 |
| 6,935,950 B2 * | 8/2005 | Tarantino | ........................ | 463/20 |
| 7,080,875 B2 * | 7/2006 | Kim | ......................... | 296/187.09 |
| 7,147,275 B2 * | 12/2006 | Matsuyama et al. | ..... | 296/203.02 |
| 7,347,491 B2 * | 3/2008 | Mouch et al. | .................. | 296/209 |
| 7,556,310 B2 * | 7/2009 | Miki | ............................. | 296/204 |
| 7,845,716 B2 * | 12/2010 | Kiyotake et al. | ......... | 296/203.02 |
| 7,887,123 B2 * | 2/2011 | Honji et al. | .............. | 296/187.09 |
| 8,002,337 B2 * | 8/2011 | Baccouche et al. | ...... | 296/203.02 |
| 8,029,046 B2 * | 10/2011 | Yamada | .................... | 296/193.02 |
| 8,371,628 B2 * | 2/2013 | Choi et al. | ..................... | 293/133 |
| 8,393,673 B2 * | 3/2013 | Terada et al. | ............. | 296/193.09 |
| 2008/0224502 A1 * | 9/2008 | Miki | ........................ | 296/203.02 |
| 2008/0265623 A1 * | 10/2008 | Kiyotake et al. | ......... | 296/187.09 |
| 2012/0187719 A1 * | 7/2012 | Fujii et al. | ................ | 296/187.09 |
| 2012/0205944 A1 * | 8/2012 | Kido et al. | ............... | 296/187.09 |

FOREIGN PATENT DOCUMENTS

| | | |
|---|---|---|
| JP | 64-78980 A | 3/1989 |
| JP | 4-262974 A | 9/1992 |
| JP | 8-104254 A | 4/1996 |
| JP | 2008-137507 A | 6/2008 |

OTHER PUBLICATIONS

Japanese Office Action dated Jan. 22, 2013, issued in corresponding Japanese patent application No. 2011-009565, w/ English translation.

* cited by examiner

*Primary Examiner* — Glenn Dayoan
*Assistant Examiner* — Gregory Blankenship
(74) *Attorney, Agent, or Firm* — Westerman, Hattori, Daniels & Adrian, LLP

(57) ABSTRACT

Left and right front side frames are disposed on left and right side of vehicle front portion, respectively, and extend in a front-and-rear direction of the vehicle body. The left and right front side frames each include a lower branching frame having an inclined part inclined downward from a front part of a motor room toward a vehicle floor, and an upper branching frame branching from the lower branching frame, disposed above the inclined part of the lower branching frame, and including a bent part. The upper branching frame is supported by a plurality of support columns connected to frames disposed around the motor room.

10 Claims, 10 Drawing Sheets

VEHICLE FRONT PORTION STRUCTURE

CROSS REFERENCES TO RELATED APPLICATIONS

The present application claims priority under 35 U.S.C. §119 to Japanese Patent Application No. 2011-009565 filed Jan. 20, 2011, entitled "Vehicle Front Portion Structure." The contents of this application are incorporated herein by reference in their entirety.

FIELD OF THE INVENTION

The present invention relates to a vehicle front portion structure and, specifically, relates to a vehicle front portion structure having impact-absorbing front side frames designed to improve their absorbability of a collision energy caused by a severe frontal collision.

BACKGROUND OF THE INVENTION

To date, vehicles have included left and right front side frames each disposed on the left and right sides of the vehicle front portion and extending in the front-and-rear direction of the vehicle body (for example, refer to Japanese Patent No. 3400566 (paragraph [0019] and FIGS. 1 and 5) and Japanese Unexamined Patent Application Publication No. 2008-137507 (FIGS. 1, 2, and 4).

Japanese Patent No. 3400566 discloses a vehicle front portion structure that prevents a power unit from entering a vehicle room. The structure has front side frames each branching into an upper frame and a lower frame; when the vehicle is involved in a frontal collision, front members mounted on the lower frames push up the front part of the power unit so as to rotate the power unit, whereby the power unit falls under a toe board.

With such a structure described above, since the lower frames of the front side frame, which each branch into a substantially Y-shape toward the front of the vehicle, are inclined downward toward the front, the branching parts can be bent downward and the power unit may easily fall not to enter the vehicle room.

Japanese Unexamined Patent Application Publication No. 2008-137507 discloses another vehicle front portion structure. This structure has front side frames each branch into a plurality of interconnecting members in which the vicinity of respective suspension towers. A load caused by a frontal collision and applied to the front side frames can be distributed among front pillars.

With such a vehicle front portion structure, when the vehicle is involved in a severe frontal collision, since the collision load applied to the front side frames is transferred to the top and bottom of the front pillars via the plurality of the interconnecting members, the collision load can be distributed.

SUMMARY OF THE INVENTION

When considering that the vehicle is involved in a severe frontal collision, however, absorbing collision energy (collision load) more efficiently, reducing the distance in which the vehicle front portion enters the vehicle room, and consequently preventing the vehicle room from being deformed are desired.

A vehicle front portion structure is provided which is capable of efficiently absorbing collision energy during a severe frontal collision of a vehicle and which present the vehicle front portion from entering the vehicle room.

The vehicle front portion structure includes left and right front side frames each disposed on left and right sides of a vehicle front portion, respectively, and extending in a front-and-rear direction of the vehicle, wherein the left and right front side frames each include a lower branching frame having an inclined part inclined downward from a front part of a motor room toward a vehicle floor, and an upper branching frame branching from the lower branching frame, disposed above the inclined part of the lower branching frame, and including a bent part, and wherein the upper branching frame is supported by a plurality of support columns connected to frames disposed around the motor room.

With such a configuration, since the front side frame includes a lower branching frame and an upper branching frame branching from the lower branching frame, when the vehicle is involved in a frontal collision, the collision energy applied to the front side frame is distributed between the lower branching frame and the upper branching frame and firmly supported; therefore, the region forward of the branching part, where the branching frames branch, is axially crushed.

Since the upper branching frame is firmly supported by support columns, the lower branching frame is axially crushed and bent before the upper branching frame; thus, the two frames of the front side frame exhibit a stable and great reaction force against the collision load.

Since the upper branching frame has a bent form, it bends when the collision load is applied and absorbs the collision energy. Furthermore, since the upper branching frame is supported by a plurality of support columns connected to the frames disposed around the motor room, displacement in the front-and-rear direction is restricted by the support columns, and the front side frame is prevented from deforming and entering the vehicle room.

In this way, the front side frame can be shorter in the front-and-rear direction than that of known vehicles and has a collision energy absorbability equivalent to known frame structures, even though its length is shorter than that of the known front side frames, preventing the vehicle front portion from deforming and entering the vehicle room during a collision.

The upper branching frame may be a substantially L-shaped or substantially U-shaped frame having a front part disposed on a front side of a bent part and a rear part disposed on a rear side of the bent part, the front part and the rear part being connected by the bent part.

With such a configuration, the bent part of the upper branching frame may be deformed and bend as a result of receiving the collision energy during a frontal collision of the vehicle; consequently, the front side frame can be prevented from deforming and entering the vehicle room by absorbing collision energy.

The support columns may support at least the bent part.

With such a configuration, the support columns support the bent part to cause a delay in the bending of the bent part and cause the front end part of the front side frame to be deformed due to being axially crushed.

The support columns may support the front part.

With such a configuration, since the support columns support the front part, the lower branching frame can be constituted of a part larger than the upper branching frame, facilitating the axial crushing of the lower branching frame over the bending of the upper branching frame. In this way, during a frontal collision of a vehicle, the upper branching frame and the lower branching frame branched from the front side frame may be deformed.

An area of a longitudinal cross-section of the inclined part of the lower branching frame may be larger than a longitudinal cross-section of an inclined forward part disposed at a forward area of the inclined part of the front side frame.

With such a configuration, the front and rear of the inclined part can be prevented from bending by forming the inclined part of the lower branching frame of the front side frame with a longitudinal cross-section larger than the longitudinal cross section of the front part of front side frame; accordingly, deformation due to axial crushing absorbing a larger amount of energy is possible.

A first end of each of the support columns may join a damper base, and a second end may join the bent part.

With such a configuration, since the damper base is supported by joining a first ends of the support columns and a damper base and joining a second ends and the bent part, the damper base can be reinforced, and the rigidity of the vehicle front portion can be increased.

Each front side frames may include a front end part connected to a front bulkhead disposed at a forward area of the vehicle in the motor room, a branching part disposed at a rearward area of the front end part and branching into the lower branching frame and the upper branching frame, a rear end part connected to a cross member extending in a width direction of the vehicle or a floor frame extending in the front-and-rear direction of the vehicle, and a connecting part disposed at a forward area of the rear end part and joining the lower branching frame and the upper branching frame.

With such a configuration, when collision load is applied to the front end part of the front side frame during a frontal collision of a vehicle, collision energy is applied to be distributed between the lower branching frame and the upper branching frame, which branch from the branching part, in the front side frame. The lower branching frame absorbs the collision energy as the inclined part is axially crushed. The upper branching frame absorbs the collision energy as the bent part bends.

In this way, the front side frame absorbs the collision energy in a well-balanced manner in the front-and-rear direction through deformation of the two frames, i.e., the lower branching frame and the upper branching frame, due to axial crushing and bending. Thus, the displacement of the front side frame towards the vehicle room during a frontal collision is reduced, and deformation of the vehicle room can be reduced.

The present invention provides a vehicle front portion structure capable of efficiently absorbing collision energy during a frontal collision of a vehicle and can reduced the displacement of the vehicle front portion into the vehicle room.

BRIEF DESCRIPTION OF THE DRAWINGS

The advantages of the invention will become apparent in the following description in conjunction with the drawings, wherein:

FIG. 53 is an enlarged sectional view taken along line VB-VB in FIG. 4;

FIG. 8A is a schematic side view of the deformation at an initial stage of the collision, FIG. 83 is a schematic side view of the deformation at a middle stage of the collision, and FIG. 8C is a schematic side view of the deformation at a final stage of the collision;

FIG. 9A is a schematic side view of the deformation at an initial stage of the collision, FIG. 9B is a schematic side view of the deformation at a middle stage of the collision, and FIG. 9C is a schematic side view of the deformation at a final stage of the collision.

DETAILED DESCRIPTION OF THE INVENTION

A vehicle front portion structure according to an embodiment of the present invention will be described with reference to FIGS. 1 to 10.

In the description below, "front" is toward the traveling direction of a vehicle C, "rear" is toward the reversed traveling direction, "top" is toward the upward vertical direction, "bottom" is toward the downward vertical direction, and "left" and "right" are in the vehicle width direction.

Configuration of Vehicle

Before describing the vehicle front portion structure, the vehicle C will be described.

Figure 1:
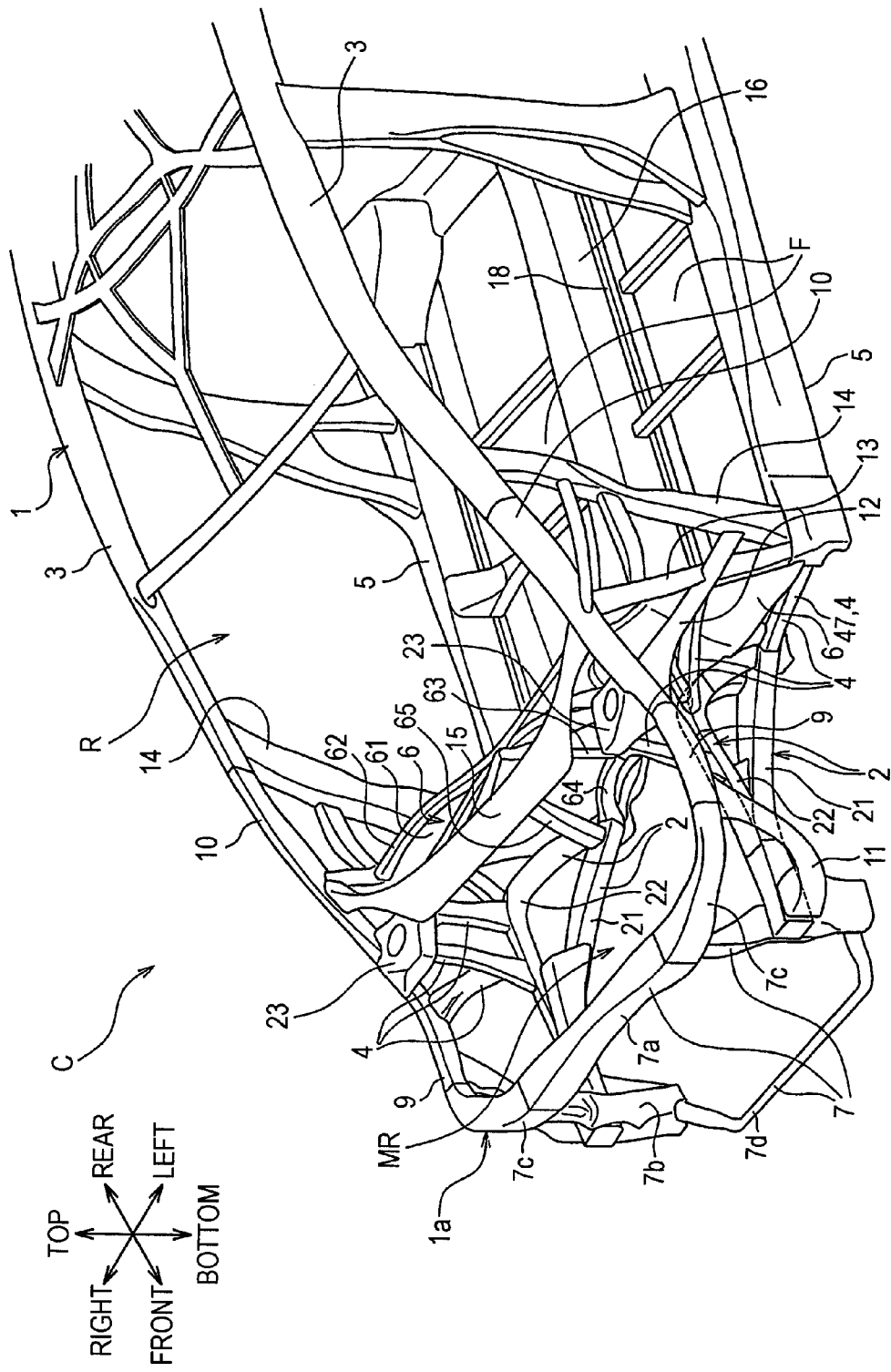
FIG. 1 is a schematic perspective view of essential parts of a vehicle front portion structure.

As illustrated in FIG. 1, the vehicle C is a vehicle, which has a motor room MR in a vehicle front portion 1a and a vehicle room (passenger compartment) R separated from the motor room MR with a partition 6, and is, for example, a front engine, rear drive (FR) passenger car or a four-wheel drive passenger car.

The model and type of the vehicle C is not limited so long as it is a vehicle with a motor room MR accommodating a power unit (not shown), such as an engine. The present invention will be described below through an example FR passenger vehicle.

Configuration of Vehicle Body

As illustrated in FIG. 1, a vehicle body 1 constitutes the entire vehicle C and mainly includes various metal vehicle frames, such as front side frames 2, a hood (not shown), metal vehicle panels, such as a fender panel, and a resin or metal bumper face (not shown).

The vehicle front portion 1a of the vehicle body 1 includes on each of the left and right sides, which are substantially symmetrical, components constituting the frame of the vehicle body 1, i.e., a front bulkhead 7, an upper member 9, a front pillar upper part 10, a lower member 11, the front side frame 2, support columns 4, a damper base 23, a front pillar support 12, a front front-pillar lower part 13, a rear front-pillar lower part 14, a windshield support frame 15, a tunnel frame 16, a cross member 17 (see FIG. 7), a floor frame 18, and a side sill 5.

Since the vehicle front portion 1a is substantially left-right symmetrical, the left side of the vehicle body 1 will be mainly described below, and the description of the right side of the vehicle body 1 will be omitted when possible.

Configuration of Motor Room

As illustrated in FIG. 1, the motor room MR is a storage space in which the power unit (not shown) is disposed and is defined by frame and panel members disposed around the motor room MR.

In the motor room MR, the front bulkhead 7, the bumper (not shown), etc. are disposed toward the front; the partition 6, the cross members 17 (see FIG. 7), the windshield support frame 15, etc. are disposed toward the rear; left and right bumper beam extensions 81 (see FIG. 2), which are disposed in the lower left and right areas along the front-and-rear direction, the upper members 9, and the front pillar upper parts 10 are disposed; left and right front side frames 2 are disposed on the lower left and right areas along the front-and-rear direction of the vehicle body 1; and the support columns 4 connect the front side frames 2 and the upper members 9, etc.

The motor room MR and the front side frames 2 provide a crush stroke that absorbs collision energy by being crushed during a severe frontal collision of the vehicle C.

The term "frames disposed around the motor room" refer to the upper members 9, the front pillar, upper parts 10, the front side frames 2, etc.

Configuration of Front Bulkhead

The front bulkhead 7 is a frame member disposed at the front of the motor room MR along the width of the vehicle and surrounds the periphery of a radiator (not shown). The front bulkhead 7 includes, as described below, a bulkhead upper part 7a, bulkhead side stays 7b, bulkhead upper side frames 7c, and a bulkhead lower part 7d, which are connected in a substantially rectangular shape.

As illustrated in FIG. 1, the bulkhead upper part 7a is a frame member constituting the upper region of the front bulkhead 7, which is substantially shaped as a frame.

The bulkhead side stays 7b are frame members constituting the left and right regions of the front bulkhead 7 and hang from the left and right ends of the bulkhead upper part 7a, toward the inner side surfaces of the front end parts 2a of the front side frames 2.

The bulkhead upper side frames 7c are frame members, which are arc-shaped in plan view and connected to the left and right ends of the bulkhead upper part 7a; the upper members 9 extend rearward from the rear side of the bulkhead upper side frames 7c.

The bulkhead lower part 7d is a frame member constituting the lower region of the front bulkhead 7 and is disposed below and parallel to the bulkhead upper part 7a.

Configurations of Upper Members, Front Pillar Upper Parts, and Lower Members

The upper members 9 are frame members disposed at the upper side areas of the motor room MR in the front-and-rear direction; the front ends thereof are connected to the bulkhead upper side frames 7c, and the rear ends thereof are connected to the front pillar upper parts 10.

The front pillar upper parts 10 are frame members disposed on the left and right sides of the windshield (not shown); the rear ends thereof are connected to side rails 3 disposed on the roof side surfaces.

The lower members 11 are frame members; the upper ends thereof are connected to the lower surfaces of the connecting regions of the upper members 9 and the bulkhead upper side frames 7c, and the lower ends thereof are connected to the outer side surfaces of the front end parts 2a of the front side frames 2.

Configuration of Power Unit

The power unit (not shown) includes, for example, an engine and transmission and is disposed in the motor room MR by attaching mounting members and subframes (not shown) to mounting brackets 2j of the front side frames 2.

Configuration of Front Side Frames

Figure 2:
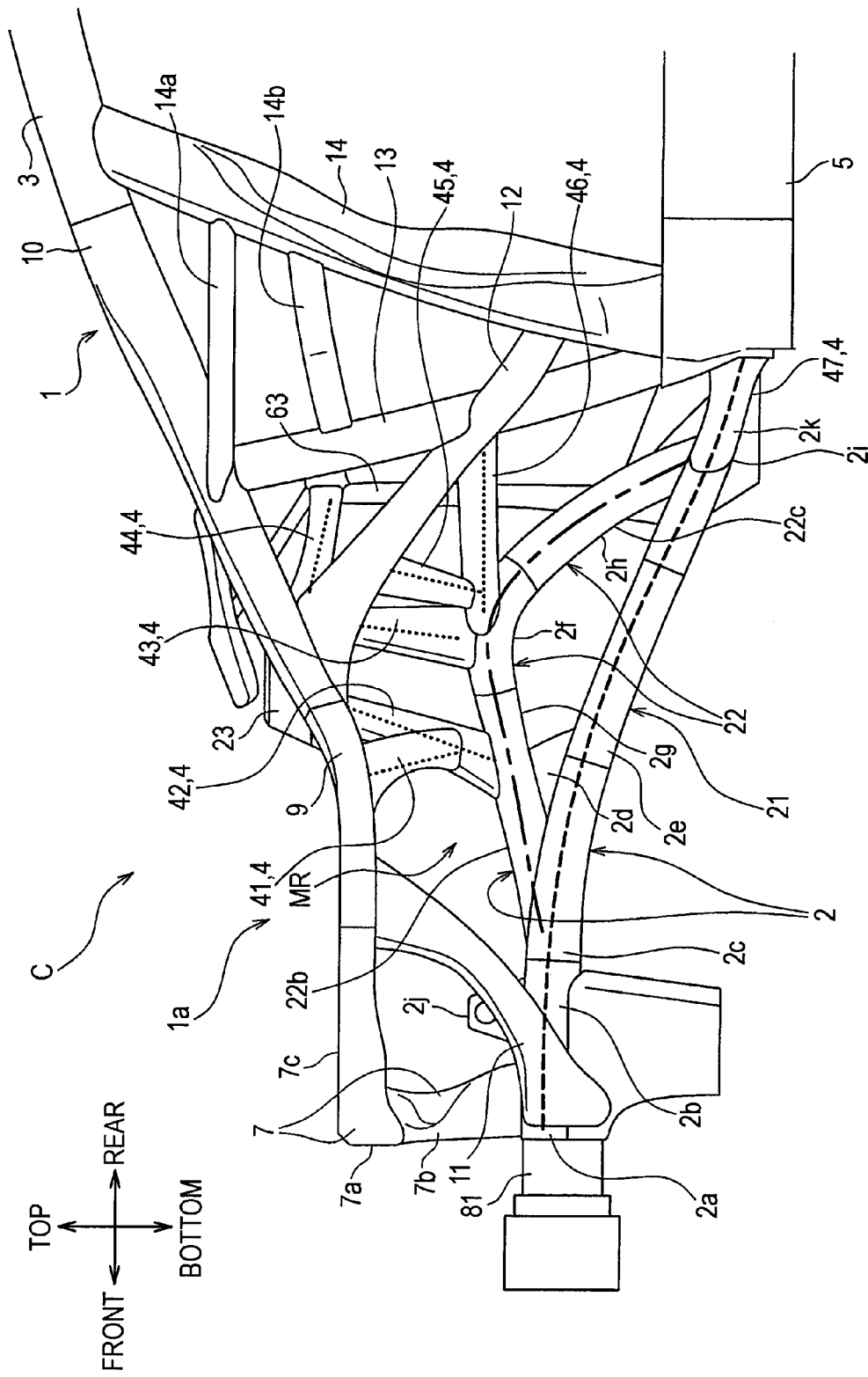
FIG. 2 is a schematic enlarged side view of a front side frame installed on the vehicle front portion structure.

As illustrated in FIG. 2, the front side frames 2 are left and right frame members constituting part of the vehicle front portion 1a and are made of, for example, rigid rectangular steel pipes having substantially square cross-sections. Each of the front side frames 2 includes, as described below, the front end part 2a, an inclined forward part 2b, a branching part 2c, a reinforcement part 2d, an inclined part 2e, a bent part 2f, a front part 2g, a rear part 2h, a connecting part 2i, the mounting bracket 2j, a rear end part 2k, an upper branching frame 22, and a lower branching frame 21.

In the front side frame 2, the region from the front end part 2a to the branching part 2c and the region from the connecting part 2i to the rear end part 2k each includes a rectangular, cylindrical member; the region from the branching part 2c to the connecting part 2i includes two rectangular cylinders arranged in a substantially bow-legged shape, i.e., the lower branching frame 21 in the lower region and the upper branching frame 22 in the upper region.

Figure 3:
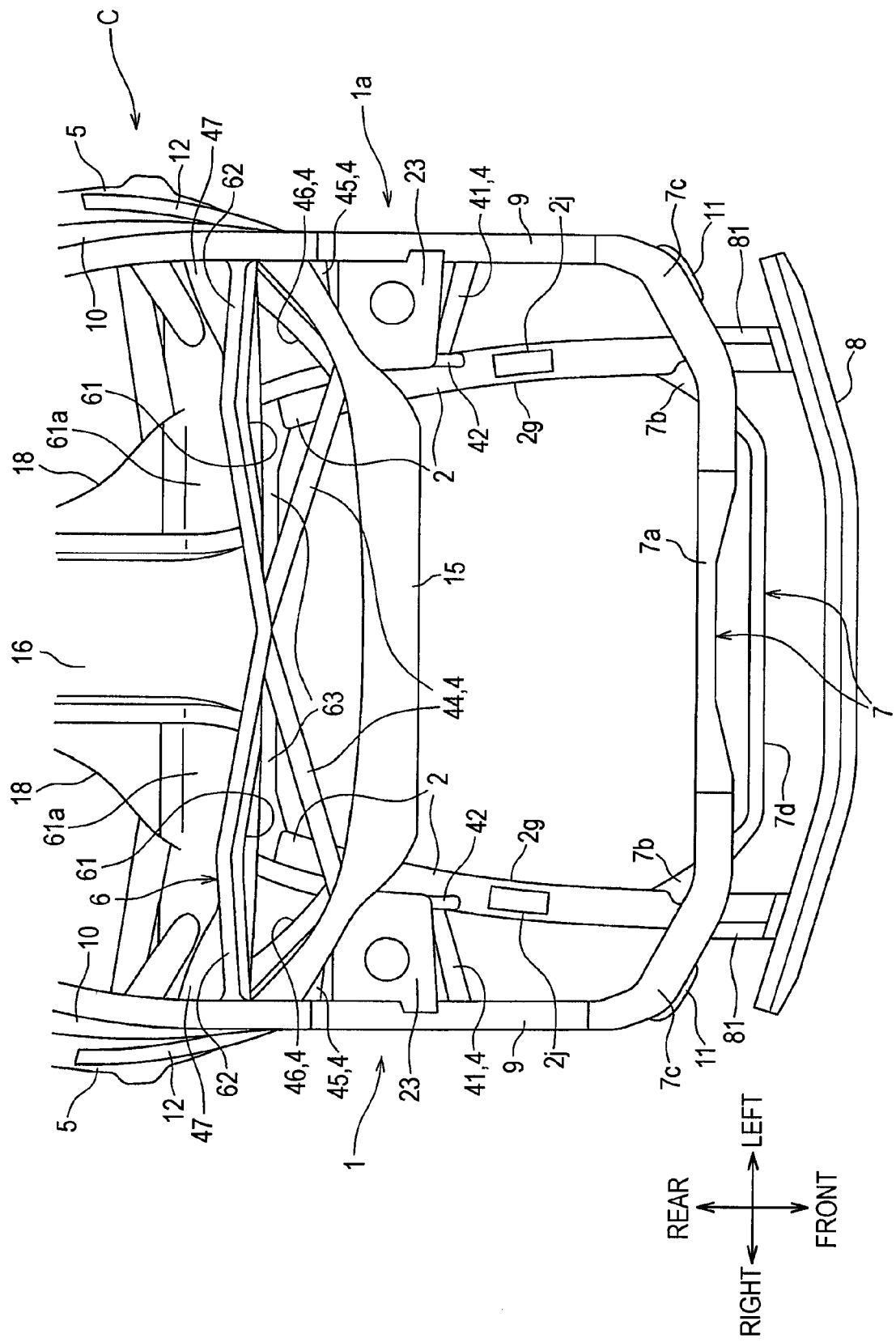
FIG. 3 is a schematic plan view of the front side frame installed on the vehicle front portion structure.

As illustrated in FIG. 3, in plan view, the front side frames 2 extend rearward from the left and right ends of a bumper beam 8 of the vehicle front portion 1a, and the rear end parts 2k are welded to the cross members 17 and the floor frames 18. See also FIG. 7. Fender panels (not shown) are attached to the outer sides of the front side frames 2 and the upper members 9.

As illustrated in FIG. 2, the front end part 2a constitutes the front end region of each of the front side frames 2. Each bumper beam extension 81, which absorbs impact during a collision by being crushed by the collision energy, is fastened with a bolt to the front surface of the corresponding front end part 2a; the bulkhead side stay 7b of the front bulkhead 7 is connected to the inner side surface of the front end part 2a; and the lower member 11 is secured to the outer side surface of the front end parts 2a.

Each inclined forward part 2b is constituted of a rectangular cylinder and, in side view, is disposed horizontally at the front end part 2a toward the rear; the corresponding mounting bracket 2j joins to the upper surface of the inclined forward part 2b.

At each branching part 2c, the rear end of the corresponding inclined forward part 2b, which is constituted of a rectangular, cylindrical member, branches into the lower branching frame 21 and the upper branching frame 22.

Each reinforcement part 2d reinforces the corresponding branching part 2c and is constituted of a thick triangular plate welded to the inner joining region of the lower branching frame 21 and the upper branching frame 22, which are joined in a branching manner.

Figure 4:
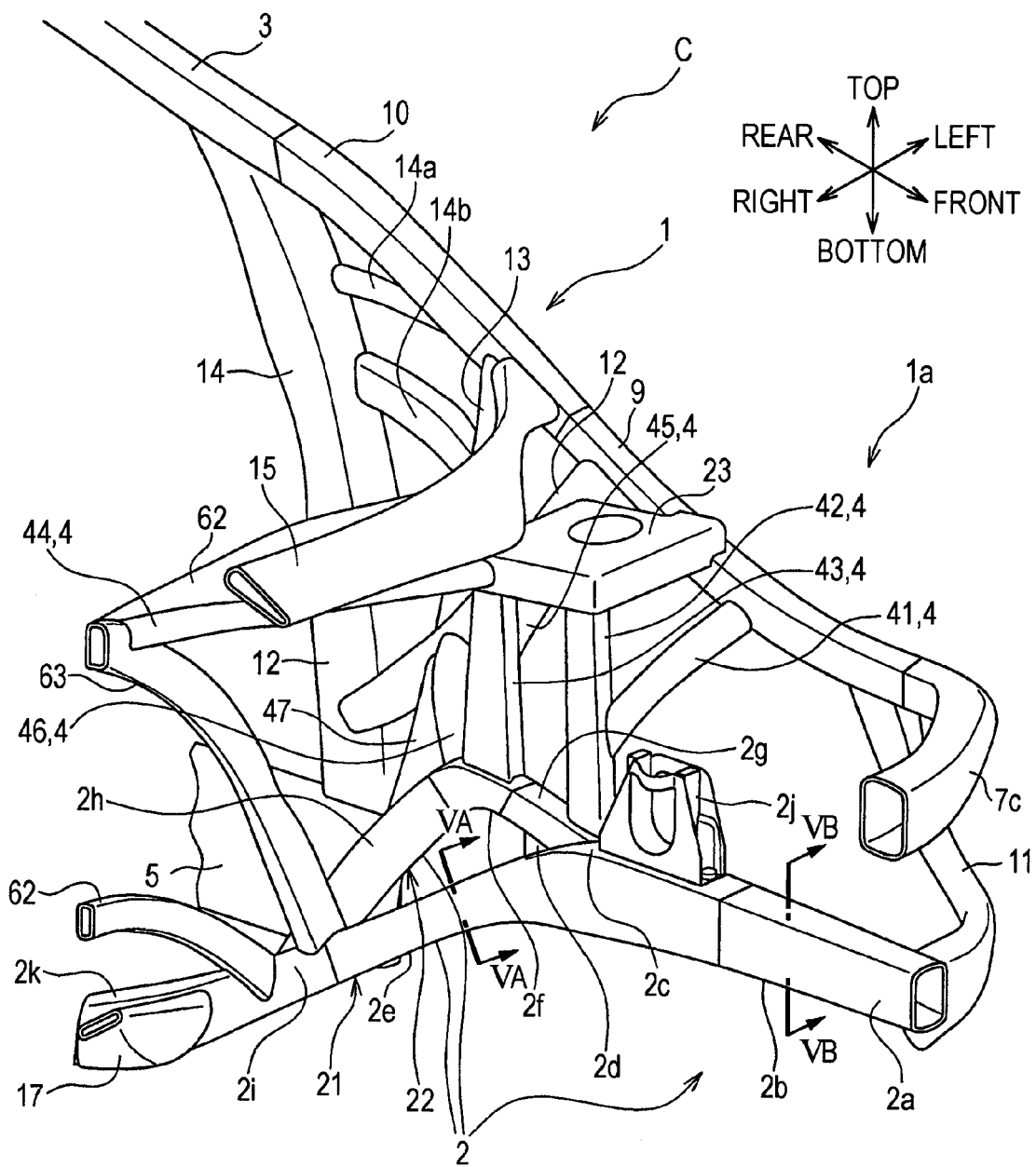
FIG. 4 is a schematic perspective view of essential parts of a front side frame installed on the left side of the vehicle on the vehicle front portion structure.

As illustrated in FIG. 4, the inclined part 2e is an inclined region disposed downward from the branching part 2c in an inclined manner. The inclined part 2e of the front side frame 2 includes the lower branching frame 21 and the rear end part 2k and is disposed from the branching part 2c toward the cross member 17 (see FIG. 7), which is suspended across the left and right side sills 5 (see FIG. 2).

Each bent part 2f is bent downward and is disposed in the middle region of the upper branching frame 22.

Each front part 2g is a rectangular cylinder that connects the branching part 2c and the bent part 2f and is disposed in such a manner that it inclines slightly upward from the branching part 2c to the bent part 2f.

Each rear part 2h is a rectangular cylinder connecting the bent part 2f and the connecting part 2i and is disposed in such a manner that it inclines downward from the bent part 2f to the connecting part 2i.

The connecting part 2i is a welded region where the rear end of the rear part 2h of the upper branching frame 22 and the lower branching frame 21 are welded together and is disposed on the front side of the rear end part 2k.

Each mounting bracket 2j is a region on which a mounting member (not shown) is mounted and is constituted of a metal thick plate welded to the upper surface of the corresponding inclined forward part 2b.

Each rear end part 2k is a rear region of the corresponding front side frame 2 and is connected to the rear of the corresponding connecting part 2i. The rear end part 2k is welded to the corresponding cross member 17, which extends in the vehicle width direction. The rear end part 2k may be connected to the front end of the corresponding floor frame 18, which extends in the front-and-rear direction of the vehicle.

Configuration of Lower Branching Frame

As illustrated in FIG. 4, the lower branching frame 21 is a frame member constituting lower part between the corresponding branching part 2c and connecting part 2i, extends linearly at an angle, and constitutes the inclined part 2e. That is, in side view, the lower branching frame 21 constitutes the inclined part 2e, which inclines downward from the middle of the end region on the front side of the motor room MR to the vehicle floor F (see FIG. 1).

Figure 5A:
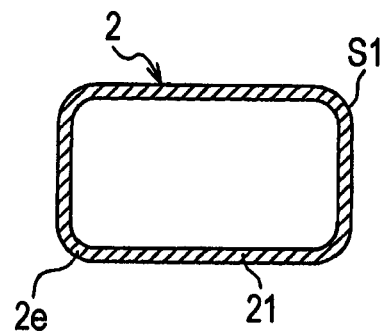
FIG. 5A is an enlarged sectional view taken along line VA-VA in FIG. 4.
Figure 5B:
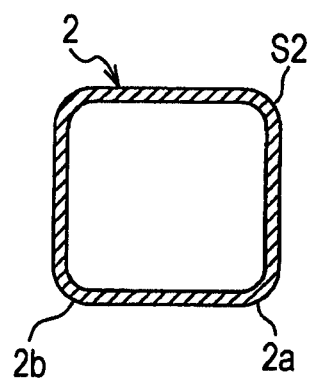

As illustrated in FIGS. 5A and 5B, the cross-section S1 of the inclined part 2e of the lower branching frame 21 is larger than the cross-section S2 of the front end part 2a of the front side frame 2. The front end part 2a is constituted of a rectangular cylinder with a substantially square cross-section. In contrast, the inclined part 2e of the lower branching frame 21 is constituted of a rectangular cylinder with an oblong cross-section. The cross-sectional area and the circumference of the inclined part 2e are larger than those of the front end part 2a; thus, the inclined part 2e is larger, thicker, and stronger than the front end part 2a.

Configuration of Upper Branching Frame

As illustrated in FIG. 4, the upper branching frame 22 is a rectangular cylinder of which the front end branches from the lower branching frame 21 at the branching part 2c, which connects to the bent part 2f, and of which the rear end joins the lower branching frame 21 at the connecting part 2i, forming a triangle on the upper side of the lower branching frame 21. In other words, the upper branching frame 22 is a substantially L-shaped or U-shaped frame including the front part 2g and the rear part 2h, which are connected by the bent part 2f, and is disposed above the inclined part 2e. The upper branching frame 22 is joined to the upper or side surface of the lower branching frame 21. The front end part and rear end part of the upper branching frame 22 are supported by the support columns 4 connected to the frames disposed around the motor room MR.

Configuration of Support Columns

As illustrated in FIG. 2, the support columns 4 are cylindrical connecting frame members that mainly support each front side frame 2 and are secured between frame members constituting the vehicle body 1 by welding. The support columns 4, as described below, include a first support column 41, a second support column 42, a third support column 43, a fourth support column 44, a fifth support column 45, a sixth support column 46, and a seventh support column 47 (see FIG. 2), which are frame members disposed around the upper branching frame 22. The support columns 4 at least support the bent part 2f and the front part 2g.

Figure 6:
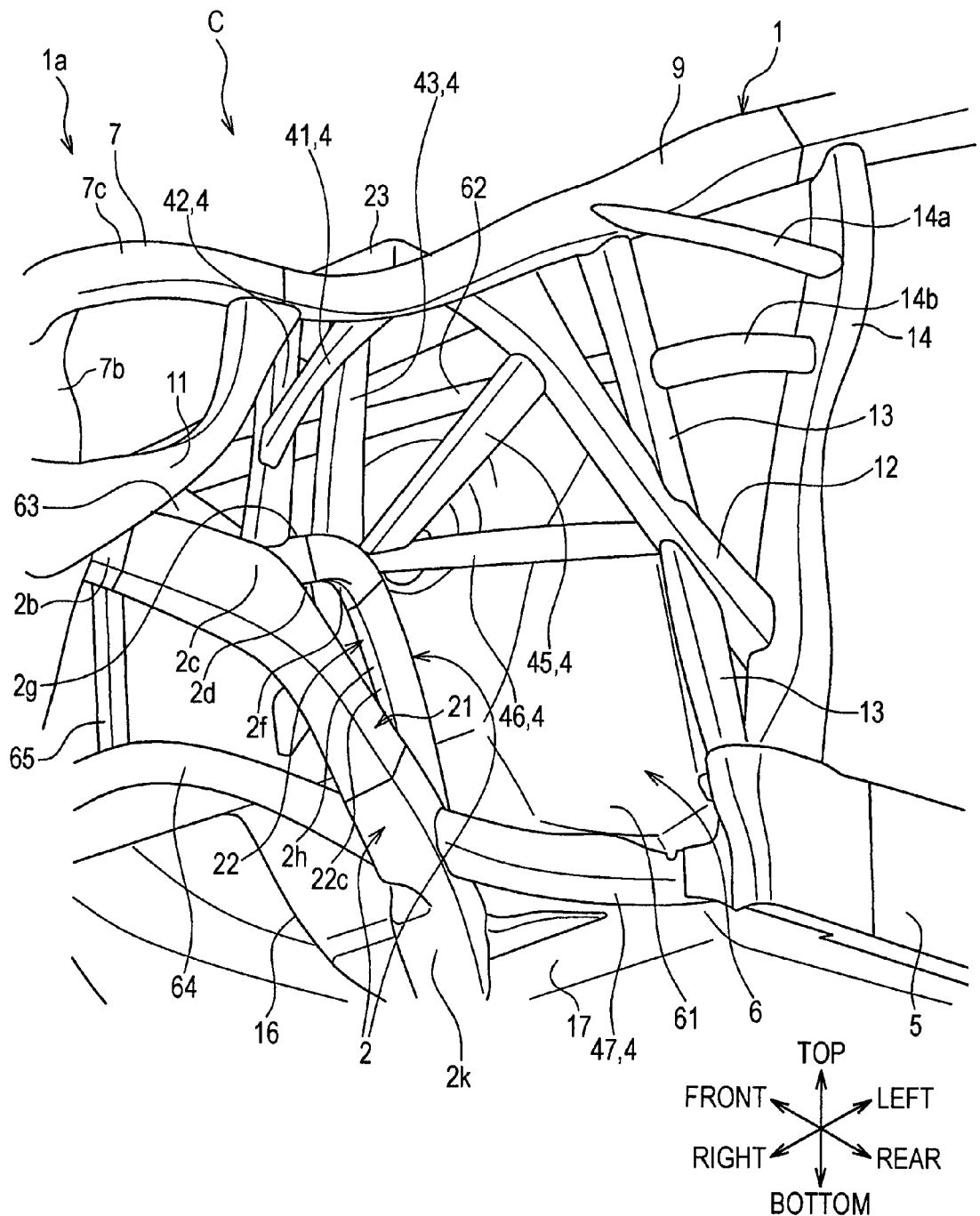
FIG. 6 is a schematic enlarged perspective view of essential parts of the front side frame installed on the vehicle front portion.

As illustrated in FIGS. 4 and 6, the upper end of the first support column 41 is connected to the upper member 9, and the lower end is connected to the middle region of the second support column 42, such that the first support column 41 extends diagonally upward and outward from the outer side surface of the middle region of the second support column 42 to the lower surface of the upper member 9. As illustrated in FIGS. 2 and 3, in side view and plan view, the first support column 41 is disposed diagonally forward from the lower end thereof to the upper end thereof.

As illustrated in FIG. 2, the upper end of the second support column 42 joins the front end region on the vehicle center side of the damper base 23 (see FIGS. 4 and 6), and the lower end joins the upper surface of the front part 2g. In side view, the second support column 42 is disposed diagonally downward from the lower end thereof to the upper end thereof.

The upper end (first end) of the third support column 43 (one of the support columns 4) joins the damper base 23, and the lower end (second end) joins the bent part 2f. As illustrated in FIGS. 2 and 6, in side view and front view, the third support column 43 is disposed substantially vertically.

Figure 7:
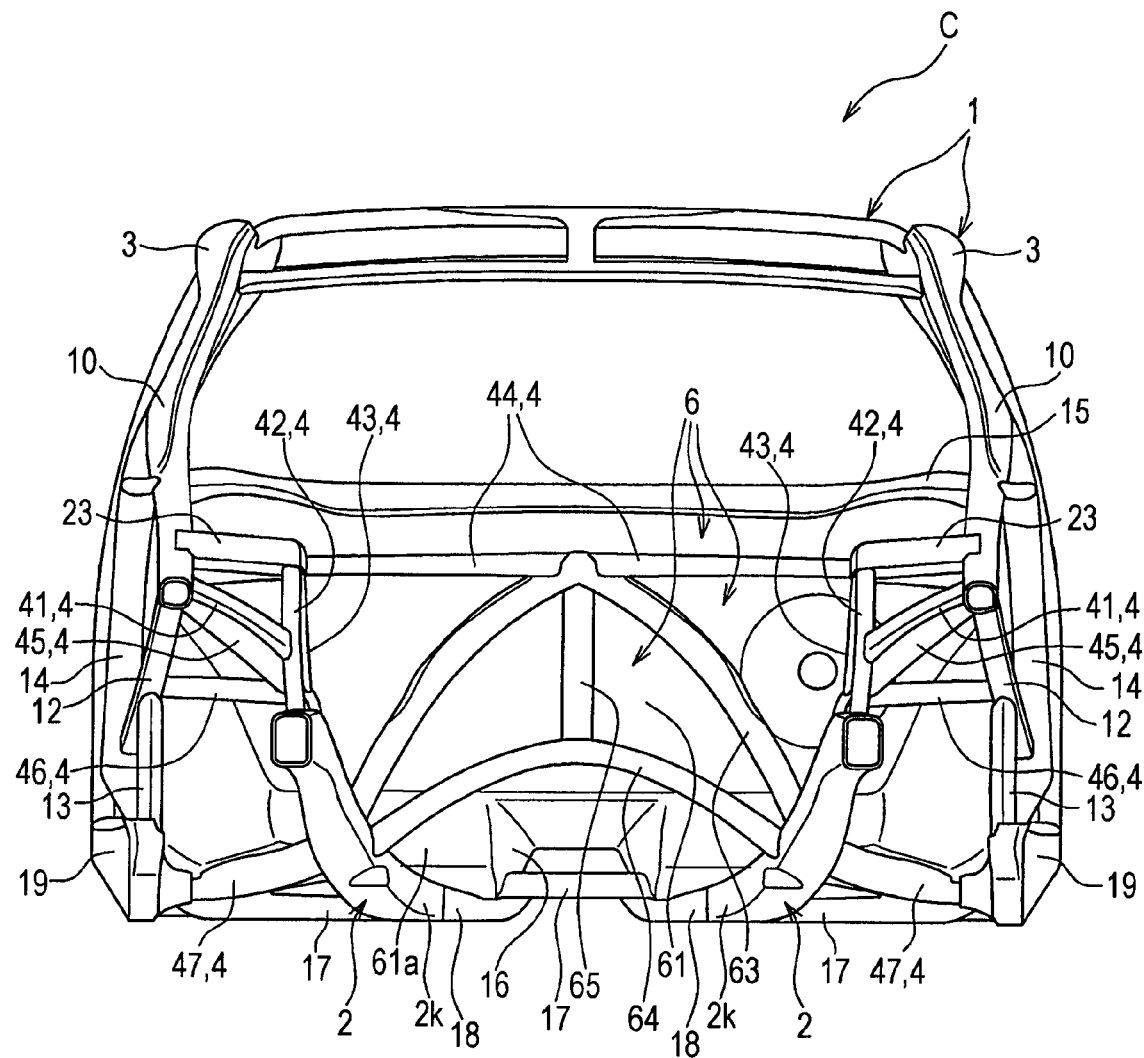
FIG. 7 is a schematic front view of the front side frames installed on the vehicle front portion.
Figure 7:
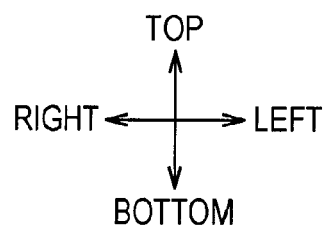

As illustrated in FIGS. 3 and 4, a first end of the fourth support column 44 joins the front end region on the vehicle center side of the damper base 23 (see FIGS. 4 and 6), and a second end joins the connecting part of an upper center reinforcement frame 63 and the windshield support frame 15. As illustrated in FIG. 3, in plan view, the fourth support column 44 is disposed diagonally rearward toward the center of the vehicle from the first end thereof to the second end thereof. As illustrated in FIG. 7, in front view, the fourth support column 44 is disposed substantially horizontally toward the center of the vehicle from the first end thereof to the second end thereof.

As illustrated in FIG. 2, the lower end of the fifth support column 45 joins the upper surface of the connecting region of the front end region of the sixth support column 46 and the bent part 2f, and the upper end joins the upper end part of the front pillar support 12. As illustrated in FIG. 6, in plan view, the fifth support column 45 is disposed diagonally toward the outer upper part of the vehicle from the lower end thereof to the upper end thereof.

As illustrated in FIG. 2, the front end of the sixth support column 46 is connected to the upper part of the bent part 2f, and the rear end joins the connecting part of the front pillar support 12 and the front front-pillar lower part 13. As illustrated in FIGS. 2, 3, 4, and 6, in side view, the sixth support column 46, from the front end to the rear end, is disposed horizontally from the center part in the outward and rearward direction of the vehicle.

As illustrated in FIGS. 2, 3, 6, and 7, the front end of the seventh support column 47 joins the outer side surface of the connecting part 2i, and the rear end joins the inner side surface at the tip of the side sill 5. In side view, the seventh support column 47, from the front end to the rear end, is disposed diagonally and horizontally from the center part in the outward and rearward direction of the vehicle.

Configuration of Damper Base

Each damper base 23 supports the upper part of the front suspension (not shown) and is constituted of, for example, a substantially rectangular thick plate with the peripheral parts, in plan view, bent downward. The damper base 23 is connected to the upper side part of the motor room MR at the rear end region of the upper member 9. The second support column 42 and the third support column 43 are connected to the forward and rearward lower surfaces on the vehicle center side, and the fourth support column 44 is connected to the rear side surface on the vehicle center side.

Configuration of Front Pillar Support

As illustrated in FIG. 2, the front end of the front pillar support 12 is connected to the lower surface of the front end part of the front pillar upper part 10, and the rear end is connected to the front surface of the rear front-pillar lower part 14 at the lower middle part. In side view, the front pillar support 12 is disposed diagonally downward toward and rearward from the upper end thereof to the lower end thereof and supports the connecting part and the periphery thereof of the front pillar upper part 10 which are connected to the upper member 9.

Configuration of Front Front-Pillar Lower Part

The upper end of the front front-pillar lower part 13 is connected to the lower surface at the middle part of the front pillar upper part 10, the lower end is connected to the upper end of the side sill 5, and the middle part joins the middle part of the front pillar support 12 and the rear end of the sixth support column 46. That is, the front front-pillar lower part 13 intersects with the front pillar support 12. The front front-pillar lower part 13, the front pillar support 12, and a front-pillar reinforcement member 14a are frame members that are reinforced in preparation for an offset collision. In side view, the front front-pillar lower part 13 is disposed slightly diagonally downward and rearward from the upper end thereof to the lower end thereof and supports the middle part of the front pillar upper part 10 and the rear end of the sixth support column 46.

Configuration of Rear Front-Pillar Lower Part

As illustrated in FIG. 2, the upper end of the rear front-pillar lower part 14 is connected to the lower surface of the front end part of the side rails 3, and the lower end is connected to the upper end part of the side sill 5. In side view, the rear front-pillar lower part 14 is disposed slightly diagonally downward and forward from the upper end thereof to the lower end thereof. The rear front-pillar lower part 14, the front front-pillar lower part 13, and the front pillar upper part 10 are connected to form a substantially triangular frame body.

Front-pillar reinforcement members 14a and 14b and the front pillar support 12 are disposed at the front middle region of the rear front-pillar lower part 14 in such a manner that they extend across the triangular frame body. The front end of the front-pillar reinforcement member 14a joins the connecting region of the front pillar upper part 10 and the front front-pillar lower part 13, and the rear end is connected to the middle region of the front surface of the rear front-pillar lower part 14, such that the entire front-pillar reinforcement member 14a is disposed horizontally in side view.

The front end of the front-pillar reinforcement member 14b is connected to the upper rear surface of the front front-pillar lower part 13, and the rear end is connected to the middle region of the front surface of the rear front-pillar lower part 14, such that the entire front-pillar reinforcement member 14b is substantially parallel to the front-pillar reinforcement member 14a, in side view.

Configuration of Partition

As illustrated in FIG. 1, the partition 6 partitions the motor room MR and the vehicle room R and includes a dashboard main body 61, a dashboard upper member 62, an upper central reinforcement frame 63, a lower central reinforcement frame 64, and a dashboard center support column 65.

As illustrated in FIG. 3, the dashboard main body 61 is a panel member formed by bending a metal plate, such as a steel plate, and is disposed along the width direction of the vehicle.

The dashboard upper member 62 is a cylindrical frame member supporting the upper part of the dashboard main body 61 and is suspended across the left and right front pillar upper parts 10.

As illustrated in FIG. 6, the upper central reinforcement frame 63 is an arch-shaped frame member disposed below the dashboard upper member 62; the lower end of the upper central reinforcement frame 63 is connected to the upper surface of the connecting part 2i of the front side frame 2, and the upper end joins the connecting part of the fourth support column 44 and the dashboard upper member 62. The upper central reinforcement frame 63 is disposed at the center front side of the dashboard main body 61 and supports the dashboard main body 61.

In front view, the lower central reinforcement frame 64 is an arch-shaped frame member disposed between the tunnel part and the upper central reinforcement frame 63; the lower end of the lower central reinforcement frame 64 is connected to the inner side of the connecting part 2i of the front side frame 2, and the upper end joins the lower end of the dashboard center support column 65. The lower central reinforcement frame 64 is disposed at the front lower center part of the dashboard main body 61 and supports the dashboard main body 61.

The upper end of the dashboard center support column 65 is connected to the center part of the upper central reinforcement frame 63, and the lower end is connected to the center part of the lower central reinforcement frame 64, such that the dashboard center support column 65 is disposed vertically in front view.

Configuration of Windshield Support Frame

The windshield support frame 15, which is illustrated in FIG. 1, is a cylindrical member supporting the lower end part of the windshield (not shown) and is suspended across the left and right front pillar upper parts 10.

Configuration of Tunnel Frame

The tunnel frames 16, which are illustrated in FIGS. 1 and 6, are constituted of left and right hollow metal members, which extend in the front-and-rear direction from the left and right ends of the tunnel part disposed at the center part of the floor of the vehicle room R. Each of the tunnel frame 16 is, for example, a ladder frame structure with suspended members (not shown) and firmly connect to and supports the cross member 17 and the dashboard lower part 61a of the dashboard main body 61, which are disposed at the front end of the tunnel frame 16.

The tunnel part, which is also referred to as a floor tunnel, is the center region of the floor having a certain strength and includes, in front view, a metal plate having a substantially upside-down U-shaped cross-section (tunnel shape), the tunnel frame 16, and a resin material (not shown) covering the vehicle room R side of the tunnel part.

Configuration of Cross Member

The cross members 17, which are illustrated in FIGS. 6 and 7, are cylindrical frame members disposed on substantially the left and right sides of the vehicle body 1 and are also referred to as dashboard lower cross members. Each cross member 17 is connected and supported by the front ends of the corresponding left or right tunnel frame 16, the rear end part 2k of the corresponding front side frame 2, which is positioned a distance apart from the corresponding left or right front end of the tunnel frame 16 in the outward direction, and the front end region of the corresponding side sill 5 and is disposed below the dashboard lower part 61a.

Configuration of Floor Frame and Vehicle Floor

As illustrated in FIG. 1, the floor frame 18 is a frame member supporting the floor panel of the vehicle floor F and is disposed on the floor in the vehicle room R. The front end of the floor frame 18 is connected to the dashboard lower part 61a (see FIG. 3); the vehicle center side of the floor frame 18 is connected to the tunnel frame 16; and outward side of the floor frame 18 is welded to the side surface on the vehicle room side of the corresponding left or right side sill 5. The vehicle floor F is mainly constituted of a metal plate disposed on the floor of the vehicle room R.

Configuration of Side Sill

The end of the side sill 5 is a frame member orthogonal to the front front-pillar lower part 13 and the lower end part of the rear front-pillar lower part 14 and supports the cross member 17 and the corresponding left or right end of the vehicle floor F. The side sill 5 is, for example, constituted of a hollow frame member having a square cross-section and extends in the front-and-rear direction.

Operation of Vehicle Front Portion Structure

The operation of the vehicle front portion structure according an embodiment will be described below with reference to FIGS. 8A to 10 in comparison with a comparative example for a case in which the vehicle C is involved in a severe frontal collision (forward collision) with another vehicle.

Figure 8A:
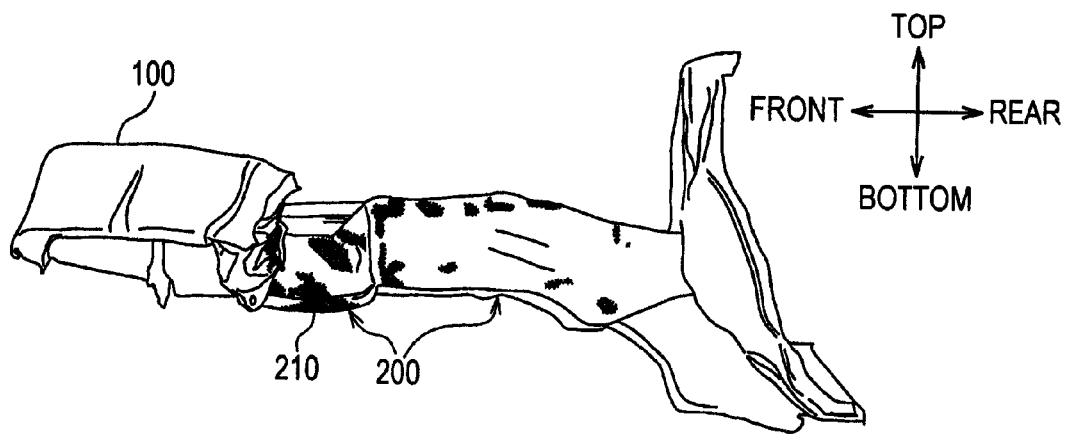
FIGS. 8A to 8C illustrate the deformation of a front side frame of a comparative example in different stages in time when a vehicle is involved in a severe frontal collision, where
Figure 8B:
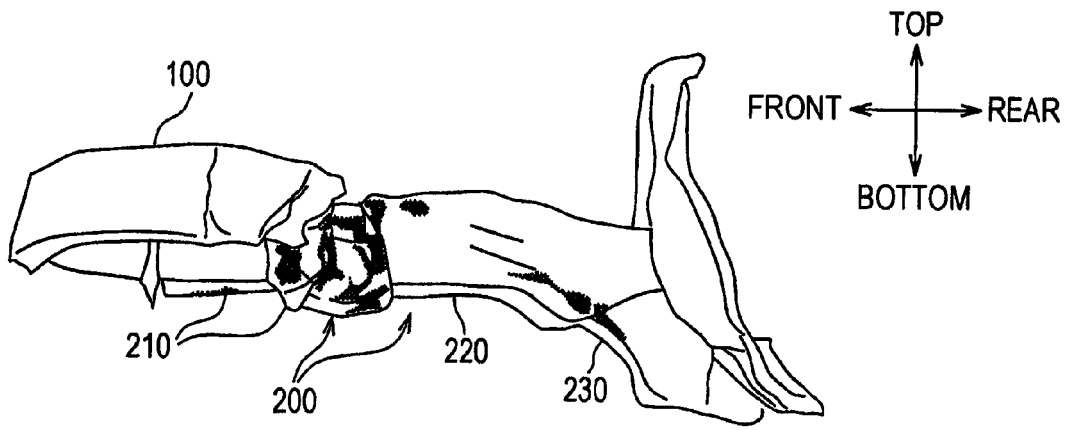
Figure 8C:
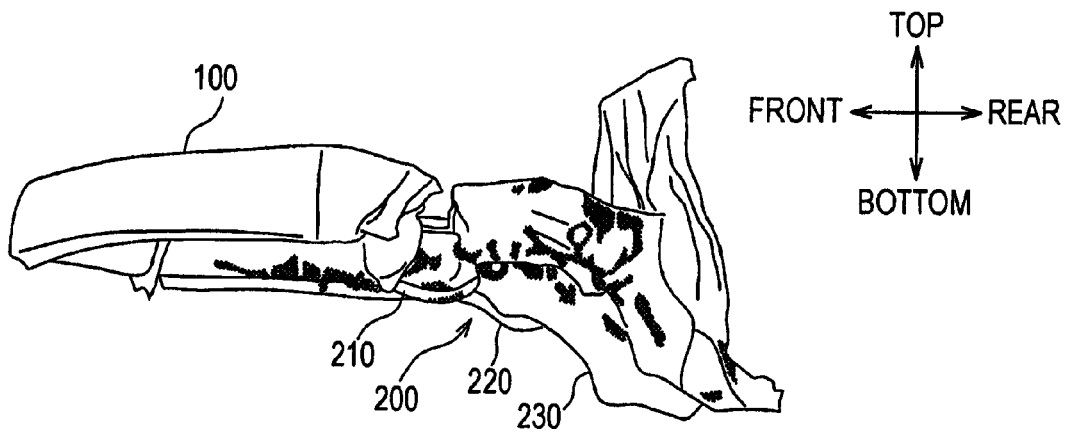
Figure 9A:
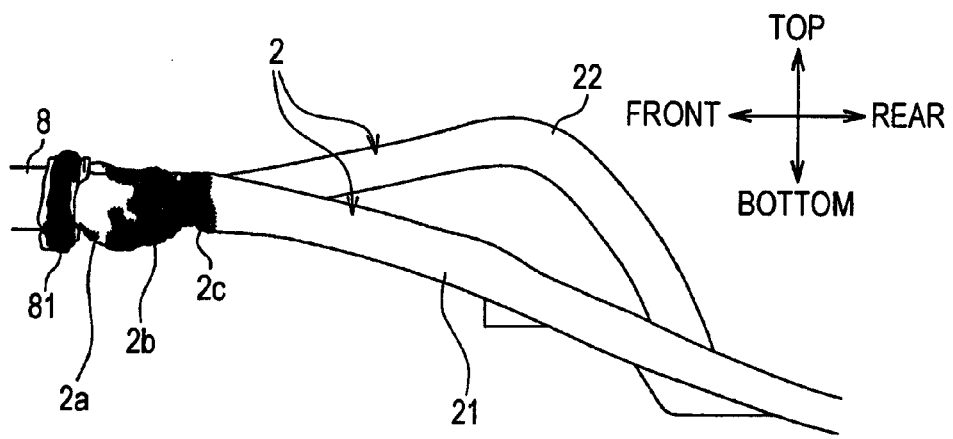
FIGS. 9A to 9C illustrate the deformation of a front side frame according to the embodiment in different stages in time when a vehicle is involved in a severe frontal collision, where
Figure 9B:
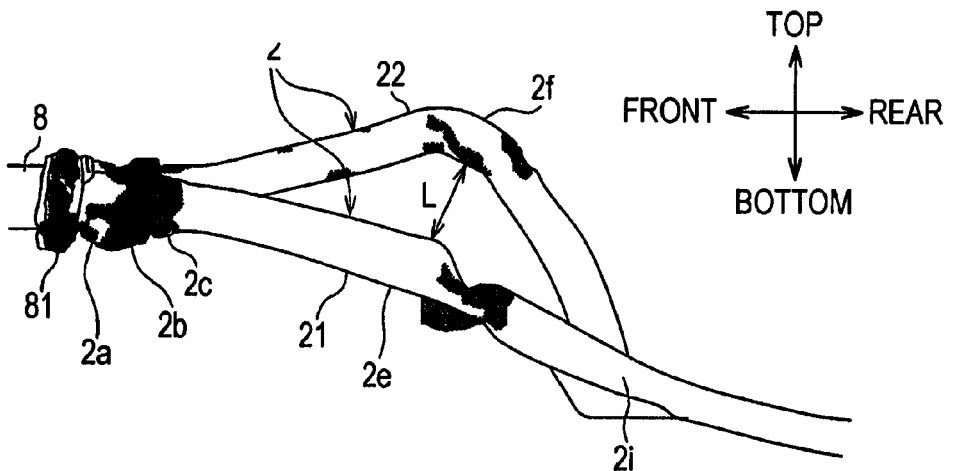
Figure 9C:
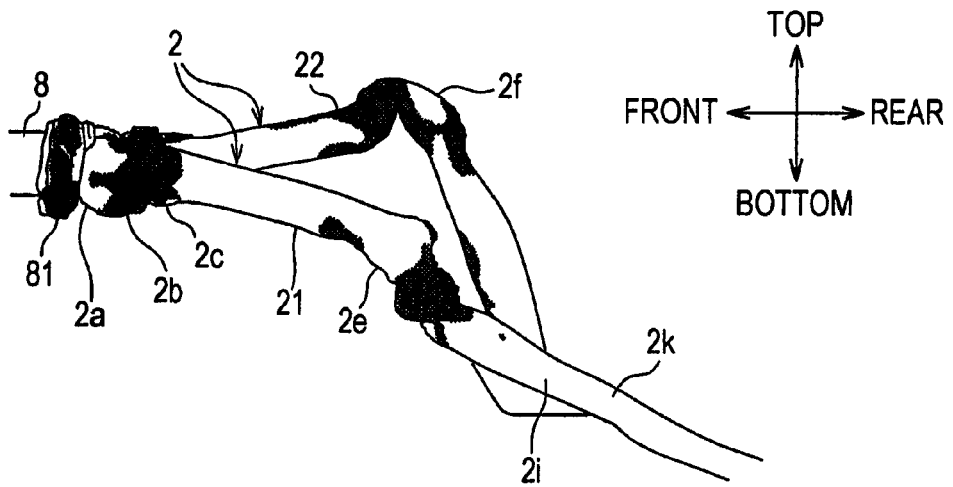
Figure 10:
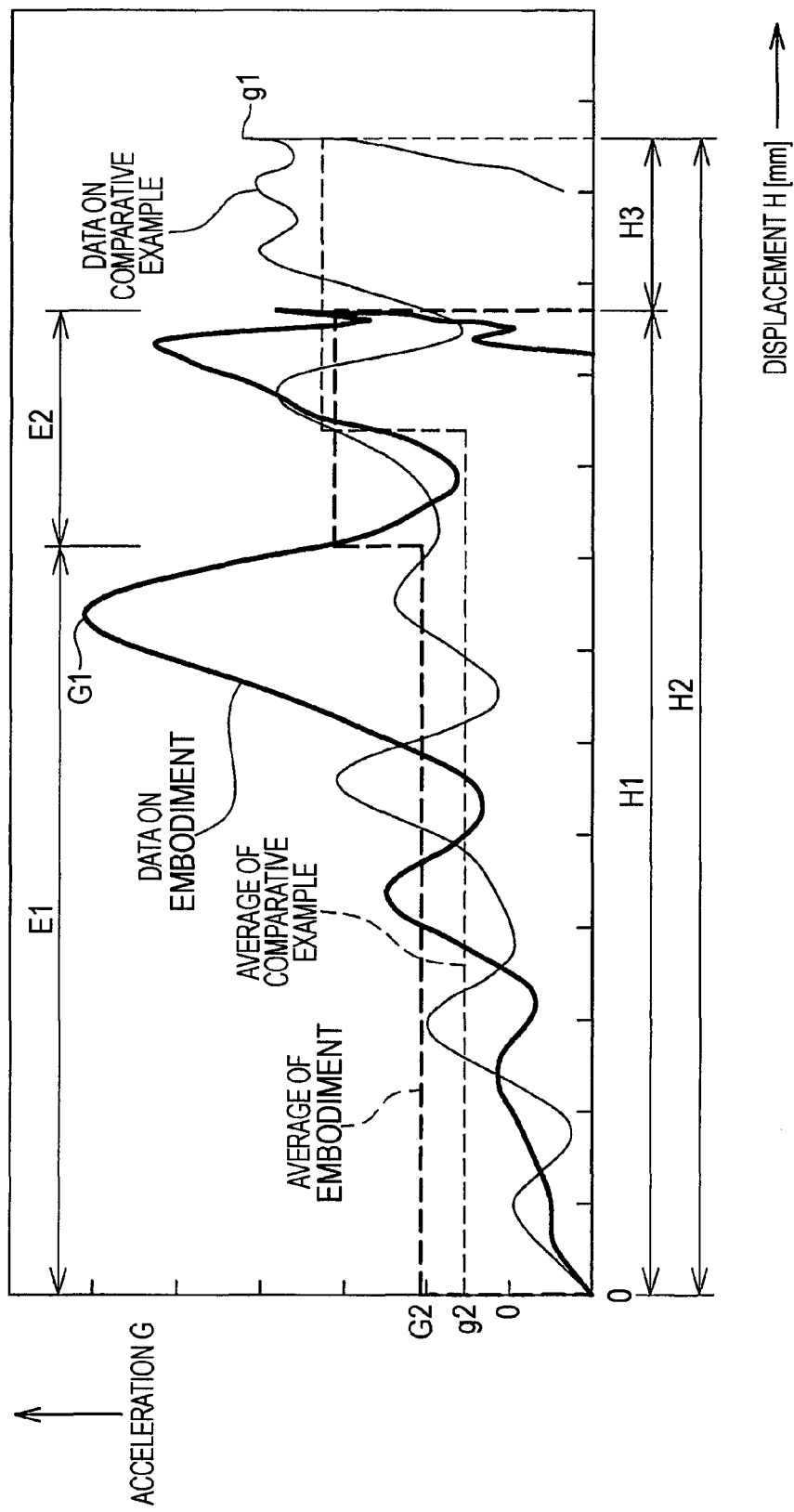
FIG. 10 is a deceleration characteristic graph illustrating the relationship between the deformation of a vehicle front portion and the acceleration of the vehicle during a full-wrap frontal collision in the embodiment and in a comparative example.

A Case in which the Vehicle in the Comparative Example is Involved in a Severe Frontal Collision FIGS. 8A to 8C illustrate the deformation of the front side frame in different stages of time when a vehicle in a comparative example is involved in a severe frontal collision; FIG. 8A is a schematic side view of the deformation at an initial stage of the collision, FIG. 8B is a schematic side view of the deformation at a middle stage of the collision, and FIG. 8C is a schematic side view of the deformation at a final stage of the collision. FIGS. 9A to 9C illustrate the deformation of the front side frame according to an embodiment in different stages of time when a vehicle is involved in a severe frontal collision; FIG. 9A is a schematic side view of the deformation at an initial stage of the collision, FIG. 9B is a schematic side view of the deformation at a middle stage of the collision, and FIG. 9C is a schematic side view of the deformation at a final stage of the collision. FIG. 10 is a deceleration characteristic graph illustrating the relationship between the displacement of a vehicle front portion structure and the acceleration of the vehicle during a full-wrap collision in the embodiment and in a comparative example.

In FIG. 10, the horizontal axis represents the displacement of the front side frame, and the vertical axis represents acceleration (deceleration).

As illustrated in FIG. 8A, left and right front side frames 200 of the vehicle in the comparative example are larger and heavier than the front side frames 2 (see FIG. 9A) of the embodiment and are disposed on the left and right sides.

When the vehicle in the comparative example is involved in a severe frontal collision with another vehicle while traveling, at the initial stage of the collision, as illustrated in FIG. 8A, bumper beams 100 are pushed rearward by the other vehicle, causing the front end parts 210 of the front side frames 200 to be axially crushed.

As illustrated in FIG. 8B, at the middle stage of the collision, the front end parts 210 of the front side frames 200 are axially crushed and compressed.

As illustrated in FIG. 8C, at the final stage of the collision, the front side frames 200 are pushed further rearward, causing the front end parts 210 to displace while descending, and the center parts 220 and rear end parts 230 of the front side frames 200 to displace while ascending and are axially crushed.

In this way, in the case of the vehicle in the comparative example, the front side frames 200, which are each constituted of a single frame member, deform and are crushed from the front end parts 210 in a substantially S-shape. Since the front side frames 200 of the vehicle in the comparative example absorbs collision energy by being crushed, the front side frames 200 should be constituted of frame members long in the front-and-rear direction.

A Case in which the Vehicle in the Embodiment is Involved in a Severe Frontal Collision When the vehicle C is involved in a severe frontal collision with another car while travelling, as illustrated in FIG. 9A, at the initial stage of the collision, the bumper beam 8 at the vehicle front portion is pushed rearward by the other vehicle and the front end part 2a, the inclined forward part 2b, and the branching part 2c of each front side frame 2 are axially crushed by the corresponding bumper beam extension 81. In this way, at the initial stage of the collision, since the collision load is distributed between two branching members, i.e., the branching lower branching frame 21 and the upper branching frame 22, and the front side frame 2 is firmly supported, only the front end region is axially crushed before the branching part 2c.

As illustrated in FIG. 9B, at the middle stage of the collision, the middle region of the inclined part 2e of the above-disposed lower branching frame 21 is further axially crushed. In this case, since the upper branching frame 22 is firmly supported by the support columns 4, the lower branching frame 21 is axially crushed before the upper branching frame 22 and is bent.

As illustrated in FIG. 9C, at the final stage of the collision, the middle region of the inclined part 2e of the lower branching frame 21 is axially crushed even further and compressed, causing the bent part 2f of the upper branching frame 22 to bend. The time required for crushing and the amount of crushing can be adjusted by the length L (see FIG. 9B) from the inclined part 2e of the lower branching frame 21 to the bent part 2f of the upper branching frame 22 of the front side frame 2.

Since in the front side frame 2, the bent upper branching frame 22 joins the upper part of the lower branching frame 21 while being supported by the support columns 4 (see FIG. 2), a large and stable reaction force (G) can be generated against the collision load. Consequently, the rear region of the front side frame 2 from the connecting part 2i to the rear end part 2k almost does not deform; thus, displacement of the front side frame 2 towards the vehicle room R can be suppressed, preventing deformation of the vehicle room R.

As illustrated in FIG. 10, in an offset collision, the collision energy is absorbed through a displacement H1 of the front side frame 2; the displacement H1 is smaller than the displacement H2 of the front side frame 200 according to comparative example by a displacement H3 (crush stroke) even though the length of the front side frame 2 is smaller than that of the front side frame 200 in the front-and-rear direction.

When the vehicle C is involved in a full wrap collision, an acceleration G is generated at the vehicle C. The front side frame 2 is crushed (deformed) by the displacement H1, and the collision energies E1 and E2 are absorbed by the front side frame 2 in two steps. The energy absorption balance E1/E2 of the collision energies E1 and E2 is equivalent to that of the comparative example. The maximum acceleration G1 and the average acceleration G2 of the embodiment are respectively greater than the maximum acceleration g1 and the average acceleration g2 of the comparative example, and the reaction force during the collision in the embodiment is greater than that of the comparative example.

Accordingly, since collision energy is well absorbed even if the front side frame 2 is shorter than that of the comparative example, the flexibility of the layout around the motor room MR can be increased, and the weight of the vehicle C can be reduced by an amount corresponding to the reduced length of the front side frames 2.

MODIFICATIONS

The present invention is not limited to the embodiment described above and various changes and modifications are possible within the scope of the invention. Such changes and modifications are also included in the present invention.

In the above-described embodiment, the front side frames 2, the upper branching frames 22, the support columns 4, and other frame members are constituted of rectangular cylindrical frames; the present invention, however, is not limited thereto. For example, the frame members may be steel members and pressed parts, cylindrically shaped and/or having a cross-section shape as such C, H, U, L, etc. These frame members may be made of light alloys, such as aluminum alloy, or resin materials, so long as they are highly rigid.

The cross-sections of the front side frames 2 are not limited to those illustrated in FIGS. 5A and 5B; the width, height, cross-section, and thickness of the front side frames 2 may be changed appropriately when required.

The method of joining the members is not limited to welding; the method of joining may be appropriately selected from known methods, such as adhesive joining and mechanical joining.

The number and joining positions of the support columns 4 connected to the front side frames 2 may be changed appropriately.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. A vehicle front portion structure, comprising:
left and right front side frames each disposed on left and right sides of a vehicle front portion, respectively, and extending in a front-and-rear direction of a vehicle body, the left and right front side frames each including: a lower branching frame having an inclined part inclined downward from a front part of a motor room toward a vehicle floor, and an upper branching frame branching from the lower branching frame, disposed above the inclined part of the lower branching frame, and including a bent part,
wherein the upper branching frame is supported by a plurality of support columns connected to frames disposed around the motor room, and
wherein an area of a longitudinal cross-section of the inclined part of the lower branching frame is larger than an area of a longitudinal cross-section of an inclined forward part disposed at an area of the inclined part of the front side frame forward of where the upper branching frame branches from the lower branching frame.

2. The vehicle front portion structure according to claim 1, wherein the upper branching frame is a substantially L-shaped or substantially U-shaped frame having a front part disposed on a front side of the bent part and a rear part disposed on a rear side of the bent part, the front part and the rear part being connected by the bent part.

3. The vehicle front portion structure according to claim 2, wherein the support columns support at least the bent part.

4. The vehicle front portion structure according to claim 2, wherein the support columns support at least the front part.

5. The vehicle front portion structure according to claim 2, wherein a first end of each of the support columns joins a damper base, and a second end of each of the support columns joins the bent part.

6. The vehicle front portion structure according to claim 2, wherein each of the left and right front side frame includes
a front end part connected to a front bulkhead disposed in a front of the vehicle in the motor room;
a branching part disposed rearward of the front end part and branching into the lower branching frame and the upper branching frame;
a rear end part connected to a cross member extending in a width direction of the vehicle or a floor frame extending in the front-and-rear direction of the vehicle; and
a connecting part disposed forward of the rear end part and joining the lower branching frame and the upper branching frame.

7. A vehicle front portion structure, comprising:
left and right front side frames each disposed on left and right sides of a vehicle front portion, respectively, and extending in a front-and-rear direction of a vehicle body, the left and right front side frames each including: a lower branching frame having an inclined part inclined downward from a front part of a motor room toward a vehicle floor, and an upper branching frame branching from the lower branching frame, disposed above the inclined part of the lower branching frame, and including a bent part,
wherein the upper branching frame is supported by a plurality of support columns connected to frames disposed around the motor room,
wherein the upper branching frame is a substantially L-shaped or substantially U-shaped frame having a front part disposed on a front side of the bent part and a rear part disposed on a rear side of the bent part, the front part and the rear part being connected by the bent part, and
wherein a first end of each of the support columns joins a damper base, and a second end of each of the support columns joins the bent part.

8. The vehicle front portion structure according to claim 7, wherein the support columns support at least the bent part.

9. The vehicle front portion structure according to claim 7, wherein the support columns support at least the front part.

10. The vehicle front portion structure according to claim 7, wherein each of the left and right front side frame includes
a front end part connected to a front bulkhead disposed in a front of the vehicle in the motor room;
a branching part disposed rearward of the front end part and branching into the lower branching frame and the upper branching frame;
a rear end part connected to a cross member extending in a width direction of the vehicle or a floor frame extending in the front-and-rear direction of the vehicle; and
a connecting part disposed forward of the rear end part and joining the lower branching frame and the upper branching frame.

* * * * *